US009006124B2

(12) United States Patent
Maparu et al.

(10) Patent No.: US 9,006,124 B2
(45) Date of Patent: Apr. 14, 2015

(54) PROCESS FOR SYNTHESIS OF DOPED TITANIA NANOPARTICLES HAVING PHOTOCATALYTIC ACTIVITY IN SUNLIGHT (71) Applicant: Tata Consultancy Services Limited, Mumbai, Maharashtra (IN)

(72) Inventors: Auhin Kumar Maparu, West Bengal (IN); Beena Rai, Maharashtra (IN); Vivek Ganvir, Maharashtra (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 0 days.

(21) Appl. No.: 13/861,643

(22) Filed: Apr. 12, 2013

(65) Prior Publication Data
US 2013/0274091 A1 Oct. 17, 2013

(30) Foreign Application Priority Data
Apr. 13, 2012 (IN) .......................... 1224/MUM/2012

(51) Int. Cl.
*B01J 31/00* (2006.01)
*B01J 27/232* (2006.01)
*B01J 27/25* (2006.01)
*B01J 31/38* (2006.01)
*C09C 1/36* (2006.01)
*C25B 1/00* (2006.01)
*B01J 37/32* (2006.01)
*B01J 21/06* (2006.01)
(Continued)

(52) U.S. Cl.
CPC ................ *B01J 31/38* (2013.01); *B01J 27/232* (2013.01); *B01J 27/25* (2013.01); *C09C 1/3669* (2013.01); *C09C 1/3623* (2013.01); *C09C 1/3653* (2013.01); *C01P 2002/72* (2013.01); *C01P 2002/84* (2013.01); *C01P 2004/03* (2013.01); *C01P 2004/52* (2013.01); *C01P 2004/64* (2013.01); *C01P 2006/90* (2013.01); *C25B 1/003* (2013.01); *B01J 37/32* (2013.01); *B01J 21/063* (2013.01); *B01J 23/50* (2013.01); *B01J 27/24* (2013.01); *B01J 35/0013* (2013.01); *B01J 35/002* (2013.01); *B01J 35/004* (2013.01); *B01J 35/023* (2013.01); *B01J 37/0036* (2013.01); *B01J 37/009* (2013.01); *B82Y 30/00* (2013.01)

(58) Field of Classification Search
None
See application file for complete search history.

(56) References Cited

U.S. PATENT DOCUMENTS 8,172,951 B2 * 5/2012 Massholder ...................... 134/1
2006/0034752 A1 * 2/2006 Lin et al. ........................ 423/610

OTHER PUBLICATIONS

Yin et al., Preparation of Visible Light-Activated Titania Photocatalyst by Mechanochemical Method, Chemistry Letters vol. 32, No. 4 (2003), pp. 358-359.*

(Continued)

*Primary Examiner* — Melvin C Mayes
*Assistant Examiner* — Stefanie Cohen
(74) *Attorney, Agent, or Firm* — Collard & Roe, P.C.

(57) ABSTRACT

Present disclosure provides a process for the synthesis of doped titania nanoparticle having photocatalytic activity greater than 90% at 2 hours under sunlight irradiation. The process involves step a) milling a mixture containing anatase titania and a precursor compound, the compound selected from the group consisting of metal and non-metal salts, in the presence of water and oxide milling media, at a temperature in the range of 20 to 50° C. for a period of 60-120 minutes, to form a slurry, wherein the amount of water is in the range of 15 to 25% by weight of the total mixture; and b) filtering the slurry to separate the oxide milling media and obtain a filtrate containing doped titania nanoparticles.

12 Claims, 9 Drawing Sheets (51) Int. Cl.
- *B01J 23/50* (2006.01)
- *B01J 27/24* (2006.01)
- *B01J 35/00* (2006.01)
- *B01J 35/02* (2006.01)
- *B01J 37/00* (2006.01)
- *B82Y 30/00* (2011.01)

(56) References Cited

OTHER PUBLICATIONS

Aysin et al., Production of Silver Loaded Photocatalytic TiO2 Powders by Ball Milling, Nanocon 2011.*

Yin et al., "Mechanochemical synthesis of nitrogen-doped titania and its visible light induced NOx destruction ability", Solid State Ionics 172, (2004) pp. 205-209.

Shifu et al., "The preparation of nitrogen-doped photocatalyst TIOx-xNx by ball milling", Science Direct, www.sciencedirect.com, Chemical Physics Letters 413, (2005) pp. 404-409.

Yin et al., "Low temperature synthesis of $TiO_2$—$xN_y$ powders and films with visible light responsive photocatalytic activity", Solid State Communications 137, (2006), pp. 132-137.

Tang et al., "Characterization and Photocatalytic Activity of N/TiO2 Prepared by a Mechanochemcial Method Using Various Nitrogenous Compounds", Applied Mechanics and Materials vols. 71-78 (2011), pp. 748-754.

Aysin et al., "Production of Silver Loaded Photocatalytic TiO2 Powders by Ball Milling", Nanocon, 2011, total of 6 pages.

Rattanakam et al, "Visible-light-sensitive N-doped TiO2 photocatalysts prepared by a mechanochemical method: effect of a nitrogen source", Res Chem Intermed (2009) 35, pp. 263-269.

* cited by examiner

PROCESS FOR SYNTHESIS OF DOPED TITANIA NANOPARTICLES HAVING PHOTOCATALYTIC ACTIVITY IN SUNLIGHT

CROSS REFERENCE TO RELATED APPLICATIONS

This application claims priority under 35 U.S.C. 119 from Indian application Serial No. 1224/MUM/2012 filed on Apr. 13, 2012 the disclosure of which is hereby incorporated herein by reference in its entirety.

FIELD OF THE DISCLOSURE

The present disclosure relates to doped titania nanoparticles. Particularly, the present disclosure relates to the process for preparing doped titania nanoparticles with high photocatalytic activity in sunlight.

BACKGROUND

Titanium dioxide exists in nature as three different phases namely, anatase, rutile and brookite. It is mainly sourced from ilmenite ore, the most wide spread form of titanium dioxide-bearing ore around the world. Rutile is the next most abundant and contains around 98% titanium dioxide in the ore. The minerals rutile and brookite as well as anatase all have the same chemistry, but they have different structures. Rutile is the more common and well known mineral of the three, while anatase is the rarest. Anatase shares many of the same or nearly the same properties as rutile such as luster, hardness and density. However due to structural differences anatase and rutile differ slightly in crystal habit and more distinctly in cleavage. The metastable anatase and brookite phases convert to rutile upon heating.

Titanium dioxide, particularly in the anatase form, is a photocatalyst under ultraviolet (UV) light. Titania acts as a photosensitizer for photovoltaic cells, and when used as an electrode coating in photoelectrolysis cells, it can enhance the efficiency of electrolytic splitting of water into hydrogen and oxygen.

The photocatalytic activity of titania results in thin coatings of the material exhibiting self-cleaning and disinfecting properties under exposure to UV radiation. These properties make the material a candidate for applications such as medical devices, food preparation surfaces, air conditioning filters, and sanitary ware surfaces. It is also used in dye-sensitized solar cells, which are a type of chemical solar cell (also known as a Gratzel cell).

Titania particles possess large band gap (around 3.2 eV) and as a result, UV light (wavelength<387 nm) is required for its photocatalytic activity. For practical applications, it is imperative to use solar light, however, solar light contains only about 4-5% of UV light. In order to utilize the whole spectrum of solar light, surface modification of titania particles is required so as to make them active in visible range (400-700 nm) as well. The surface of titania particles can be doped with metal and non-metal atoms which extend their absorption spectrum in the visible region and thereby enhance overall photocatalytic activity of the titania particles.

Mechanochemical method for doping $TiO_2$ matrix for large scale production of doped titania nanoparticles is disclosed in the prior art. In mechanochemical method, titania particles are ground with a precursor salt using milling media for a specified time.

Yin et al. in *Solid State Ionics* 172 (2004) 205-209 reported synthesis of photocatalytic nitrogen doped $TiO_2$ by planetary ball milling of P25 (Degussa) titania powder with ammonium carbonate in the presence of zirconia balls, at room temperature followed by calcination of the doped titania particles at 400° C., in order to remove residual ammonium carbonate completely. The P25 titania powder as used consisted of 77 wt % anatase and 23 wt % rutile. During planetary ball milling with ammonium carbonate, anatase was gradually transformed to rutile with small quantity of brookite. The photocatalytic activity carried out under irradiation of light wavelength>510 nm, of doped titania prepared with ammonium carbonate increased at first up to 15 min and then gradually decreased. It was observed that at 15 minutes, the amount of doped nitrogen was only 0.06%; the prolonged ball milling to 180 minutes increased the amount of doping to 0.19%. However, it was observed that although the amount of doped nitrogen increased, the photocatalytic activity gradually decreased. These results suggest that the prolonged milling resulted in decreasing the photocatalytic activity due to the rutile formation, lattice distortion and powder agglomeration.

Shifu et al. in *Chemical Physics Letters* 413(2005) 404-409 reported synthesis of photocatalytic nitrogen doped titania by ball milling titania (100% anatase) nanoparticles (crystallite size of 30 nm) in an ammonia solution for 120 hours and air drying the powder at 110° C. in air. It was observed that with the ball milling time, the doped amount of nitrogen in the doped titania nanoparticles increased gradually which further increased photocatalytic activity. It was reported that for superior photocatalytic activity of the doped titania particles, the proper range of doped nitrogen was 0.25%, which was obtained after ball milling for 120 hours.

Yin et al. in *Solid State Communications* 137(2006), 132-137 reported synthesis of photocatalytic nitrogen doped $TiO_2$ by planetary ball milling of P25 titania powder with ammonium carbonate or urea in the presence of zirconia balls, at room temperature. The P25 titania powder consisted of 77 wt % anatase and 23 wt % rutile. The ball milled samples were washed with water and dried at 50° C. for 1 day instead of calcination at 400° C. During planetary ball milling with ammonium carbonate, anatase was gradually transformed to rutile with small quantity of brookite.

Yuchao Tang et al. in *Applied Mechanics and Materials* Vols 71-78 (2011), pp 748-754 reported synthesis of photocatalytic N doped $TiO_2$ by planetary ball milling of raw amorphous titania powder with nitrogen compound like ammonium fluoride ($NH_4F$) in presence of water, for 180 min. The wet powder was dried at a temperature of 105° C. in air for 5 hours and then calcined at 400° C. for 2 hours. Use of other nitrogen compounds such $(NH_4)_2CO_3$, $NH_4F$, $NH_4HCO_3$, $NH_4COOCH_3$, $CH_4N_2O$ were also reported, with highest visible absorption of doped titania, when milled with $NH_4F$ and weakest with $NH_4HCO_3$. Photocatalytic degradation was carried out under ultraviolet light and sunlight. Characterization of the catalysts demonstrated that the nitrogen doped $TiO_2$ could improve visible light adsorption efficiency; however $TiO_2$ surface structure was destroyed by ball milling resulting in a reduced photocatalytic activity.

Aysin et al. (in Brno, Czech Republic, EU, 21.-23.9.2011) reported photocatalytic efficiency of the silver loaded nano-sized photocatalytic titania powder prepared by ball milling photocatalytic titania powder (anatase), with 0.1 M silver nitrate solution and 1% sodium carbonate solution. Photocatalytic performance was evaluated under UV light illumination. It was observed that though the silver loading enhances the photocatalytic activity, as amount of silver loading increased, the photocatalytic activity of doped titana powder decreased.

Ramida Rattanakam et al. in Res Chem Intermed (2009) 35: 263-269 reported preparation of N doped $TiO_2$ by a mechanochemical method using high-speed ball milling of P25 $TiO_2$ with nitrogen source such as ammonia solution, hexamine and urea. The photocatalytic activity of the N doped $TiO_2$ was evaluated under visible-light/sunlight irradiation. The results indicated a slight anatase to rutile phase transformation during the mechanochemical process. It was observed that although the N doped titania photocatalysts were capable of absorbing visible light of wavelength up to 545 nm, the photocatalytic activity of the doped titania particles was not improved as compared to the starting P25.

In the prior art literature, the photocatalytic doped titania nanoparticles prepared by conventional ball milling process showed phase transformation of anatase to rutile form. Also during the doping process, residual by-products were adsorbed on the surface, affecting the activity of titania nanoparticles. To remove the undesired products on the surface of the titania nanoparticles, the nanoparticles were subjected to high temperature treatment/calcination which often lead to particle agglomeration, sintering and phase change of doped titania system. Further most of the nitrogen doped titania photocatalyst prepared by mechanical milling showed high photocatalytic activity only in presence of UV light or artificial visible light at high intensity. Under sunlight, most of them exhibited weak conversion efficiency.

Thus, in order to obviate the drawbacks associated with the prior art, there is felt a need to synthesize doped titania nanoparticles with improved photocatalytic activity under sunlight irradiation.

OBJECT

It is an object of the present disclosure to provide a simple process for the synthesis of doped titania nanoparticles having high photocatalytic activity in sunlight.

Another object of the present disclosure is to prepare doped titania nano particles having unimodal particle size distribution.

Yet another object of the present disclosure is to provide a process for preparing doped titania nanoparticles which can be carried out at an ambient temperature.

SUMMARY

In accordance with the present disclosure, there is provided a process for the synthesis of doped titania nanoparticles, said process comprising the following steps:
a) milling a mixture containing anatase titania particles, a precursor compound, said compound selected from the group consisting of metal and non-metal salts, water and oxide milling media, at a temperature in the range of 20 to 50° C. for a period of 60-120 minutes, to form a slurry, the amount of water being in the range of 15 to 25% by weight of the total mixture; and
b) filtering the slurry to separate the oxide milling media and obtain a filtrate containing doped titania nanoparticles having photocatalytic activity in sunlight.

In one embodiment of the present disclosure, the process further includes the step of drying the filtrate by any one of the methods selected from the group consisting of freeze drying, vacuum drying and air drying.

Typically, the metal salt is silver nitrate.

Typically, the non-metal salt is selected from the group consisting of ammonium carbonate and urea.

Typically, the ratio of precursor compound to titania particles is in the range of 1:5 to 1:25 w/w.

Typically, the oxide milling media consists of Zirconia balls with particle size in the range of 0.4-0.7 mm diameter.

Typically, the doped titania nanoparticles possess unimodal size distribution having median particle size of around 90-92 nm.

Typically, the doped titania nanoparticles possess photocatalytic activity greater than 90% at 2 hours under sunlight irradiation.

Typically, the amount of nitrogen doped on the anatase titania surface is 2.7%.

Typically, the amount of silver atoms doped on the anatase titania surface is 0.45%.

BRIEF DESCRIPTION OF THE ACCOMPANYING DRAWINGS

The disclosure will now be described with the help of the accompanying drawings, in which.

DETAILED DESCRIPTION

The embodiments herein and the various features and advantageous details thereof are explained with reference to the non-limiting embodiments in the following description. Descriptions of well-known components and processing techniques are omitted so as not to unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description herein after, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Ball milling is one of the most popular mechanochemical methods used for surface modification of particles. It breaks down some of the weak bonds and offers fresh oxygen-rich surface for the formation of new bonds. Additionally, the particle size of the processed material can also be decreased by the use of finer grinding media while milling. During milling, there is collision between the milling media and titania powder which increases their interface temperature. As a result, the precursors are decomposed into respective atoms which then diffuse into titania ($TiO_2$) crystal lattice. Ball milling in dry or wet is a crucial factor governing the crystal structure of the $TiO_2$. In the dry process the energy may easily be concentrated in the local region, which accelerates the phase transformation from anatase to rutile as the latter is a thermo dynamical stable morphology, whereas in the wet process, the high mechanical energy can be readily transferred through water, thereby preventing the phase transformation of titania from anatase to rutile. Following this approach, the inventors of the present disclosure have developed a process for the synthesis of doped titania through mechanochemical wet grinding using planetary ball mill.

In accordance with the present disclosure, the doped titania photocatalysts are synthesized by milling anatase titania particles with a precursor compound in a planetary ball mill. The milling is carried out in the presence of water and oxide milling balls, preferably zirconia balls. The temperature of the process is maintained at a range of 20 to 50° C., more preferably at a range of 30 to 40° C. by controlling the amount of water used in the process.

In accordance with the present disclosure, the precursor compound is selected from the group consisting of nitrogenous compounds such as ammonium carbonate and urea for nitrogen doping and silver salts such as silver nitrate for silver doping.

In a preferred embodiment of the present disclosure, the amount of water is in the range of 15 to 25% by weight of the total mixture.

Milling of anatase titania particles in the presence of water substantially less than 15% may affect the rheology (i.e. particles will not be in suspension) and hence the energy applied in the milling may not lead to efficient mechanochemical reaction. An adequate amount of water is required to form the slurry of right rheology for the efficient mechanochemical synthesis.

In a preferred embodiment of the present disclosure the ratio of precursor compound to titania particles is in the range of 1:5 to 1:25 w/w.

In a preferred embodiment of the present disclosure, anatase titania about 3.4-4 gm is mixed with about 0.2 gm to 0.6 gm precursor salts (ammonium carbonate/urea for nitrogen doping and silver nitrate for silver doping) and 20-35 ml water in a ball mill jar. Zirconia balls about 100-150 gm as an oxide milling media of 0.4-0.7 mm diameter are introduced in the jar. Milling is carried out intermittently at a speed of 200-300 rpm for two hours, controlling the temperature of the process between 20 to 50° C. The resultant slurry after milling is filtered through a filter cloth to separate the oxide milling media. The filtrate may be dried using freeze drying, vacuum drying and air drying, techniques to obtain dry doped titania nanoparticles for characterization. However, for the photocatalytic applications, nanoparticles of titania can be used in the slurry form and hence drying is not required.

The photocatalytic activity of doped titania nanoparticles is evaluated with the degradation of methyl orange, a model pollutant under irradiation of sunlight. The doped titania nanoparticles prepared in accordance with the present disclosure are found to be stable with particle sizes in nanometer ranges. The doped titania nanoparticles show unimodal particle size distribution. No agglomeration of the titania particles is observed during the milling process.

The disclosure is further illustrated with the help of the following examples which should not be construed to limit the disclosure in any way.

EXAMPLE 1

3.8 gm of anatase titania particles having purity of 99.9% was mixed with 0.2 gm of ammonium carbonate and 25 ml water in a ball mill pot. Zirconia balls (100 gm) of 0.4-0.7 mm diameter were introduced as oxide milling media in the tank. Milling was carried out at a speed of 250 rpm for two hours at 20 to 50° C. The resultant slurry after milling was filtered through a filter cloth to separate the oxide milling media. The doped titania particles were further isolated from the filtrate for characterization.

EXAMPLE 2

3.6 gm of anatase titania having purity of 99.9% was mixed with urea (0.4 g) and water (20 ml) in a ball mill tank. Zirconia balls (100 gm) of 0.4-0.7 mm diameter were introduced as oxide milling media in the tank. Milling was carried out at a speed of 250 rpm for two hours at 20 to 50° C. The resultant slurry after milling was filtered through a filter cloth to separate the oxide milling media. The doped titania particles were further isolated from the filtrate for characterization.

EXAMPLE 3

4 gm anatase titania having purity of 99.9% was mixed with 0.224 gm silver nitrate and 30 ml water in a ball mill tank. Zirconia balls (100 gm) of 0.4-0.7 mm diameter were introduced as oxide milling media in the tank. Milling was carried out at a speed of 250 rpm for two hours at 20 to 50° C. The resultant slurry after milling was filtered through a filter cloth to separate the oxide milling media. The doped titania particles were further isolated from the filtrate for characterization.

The samples as obtained above from examples 1 & 3 were tested for characterization as follows.

Figure 1:
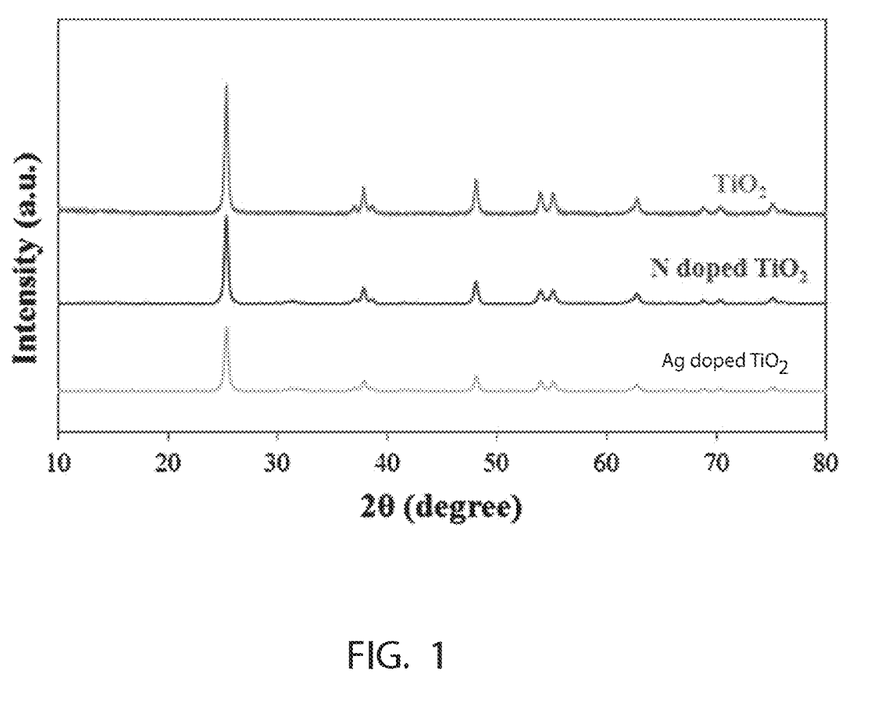
FIG. 1 shows X-ray diffraction patterns of $TiO_2$ before and after doping with nitrogen and silver atoms.

X-Ray Diffraction Analysis:

FIG. 1 shows the XRD patterns of anatase titania particles before and after doping with nitrogen and silver. The corresponding peaks match exactly with titania in anatase form. That means ball milling at 200-300 rpm for 2 hours in the presence of the controlled amount of water does not change the crystal phase of anatase titania.

Figure 2:
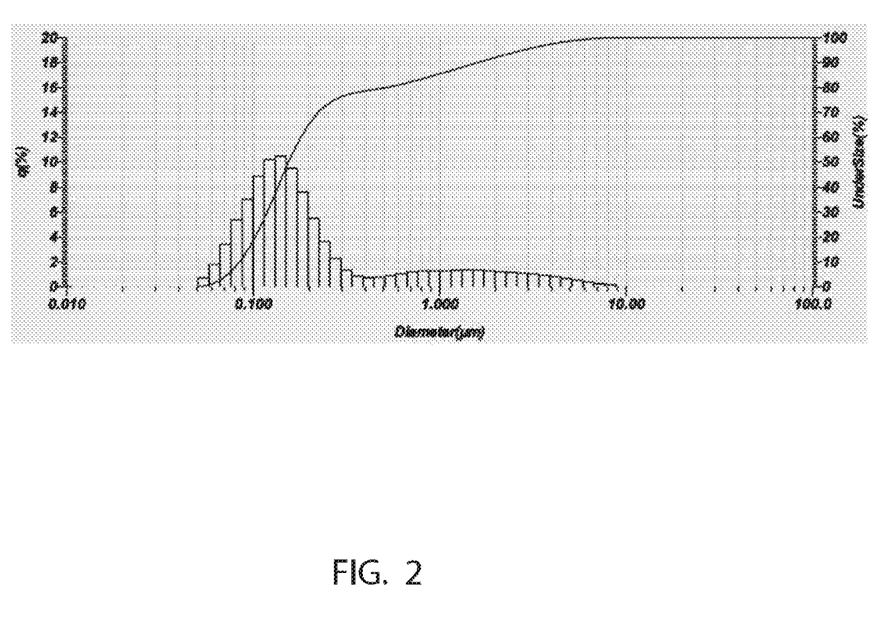
FIG. 2 shows particle size distribution of anatase $TiO_2$ samples before doping.
Figure 3:
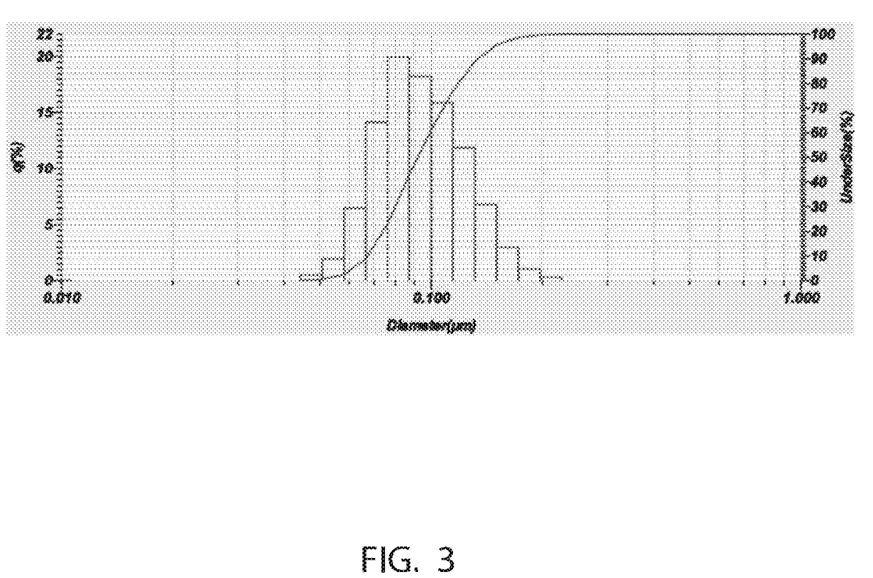
FIG. 3 shows particle size distribution of N doped $TiO_2$ samples.
Figure 4:
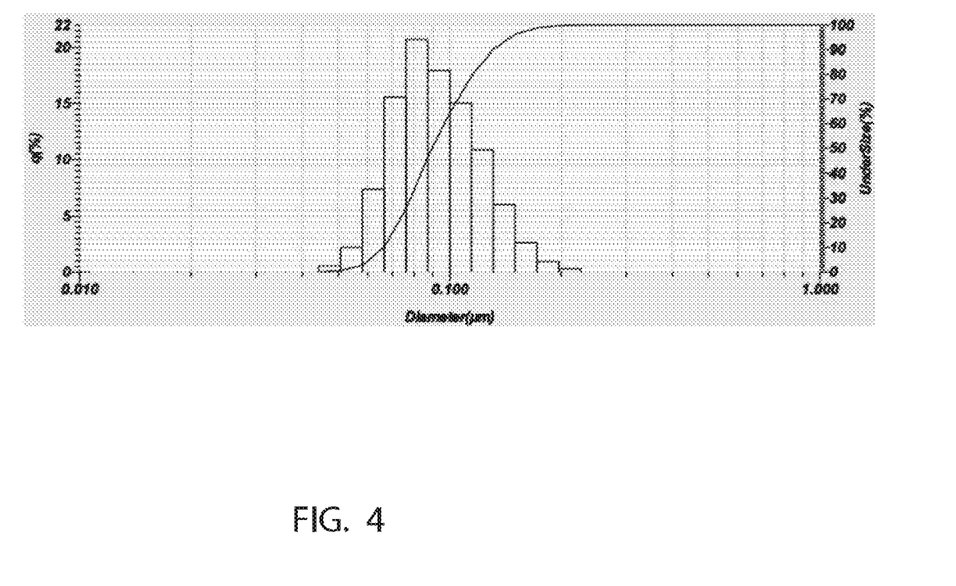
FIG. 4 shows particle size distribution of Ag doped $TiO_2$ samples.

Particle Size Distribution:

FIGS. 2, 3 & 4 shows particle size distribution of anatase titania, N doped titania and Ag doped titania, respectively. Anatase titania possesses bimodal size distribution, one in 50-300 nm range and another one in 400-8000 nm range. After milling in the planetary ball mill for 2 hours, the size distribution became unimodal with median size 92 nm and 90 nm for titania samples doped with nitrogen and silver, respectively.

Figure 5A:
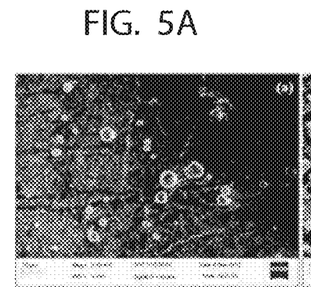
FIG. 5 shows Scanning Electron Microscopy (SEM) images of $TiO_2$ a) before doping, b) after N doping, c) after Ag doping and EDX results of d) Ag doped $TiO_2$ samples.
Figure 5B:
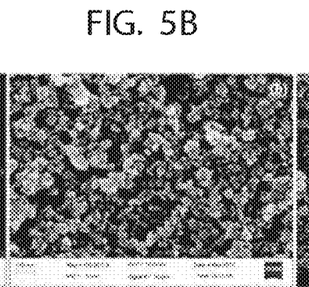
Figure 5C:
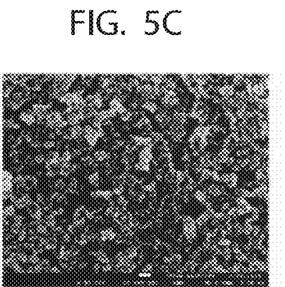
Figure 5D:
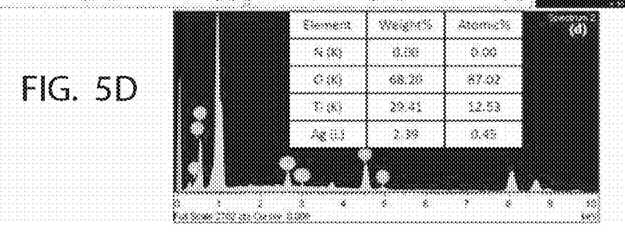

Scanning Electron Microscopy:

The size of the titania samples is further confirmed by SEM analysis, shown in FIGS. 5a-d. The undoped titania samples (as received) are found to be polydispersed with particle size ranging from 1 μm to 5 μm (FIG. 5a). After milling, the particles became highly monodispersed with particle size below 100 nm (FIGS. 5b and 5c) which is quite consistent with particle size distribution analysis. Also, the presence of silver in Ag doped tiania particles is confirmed by EDX analysis, shown in FIG. 5d.

Figure 6:
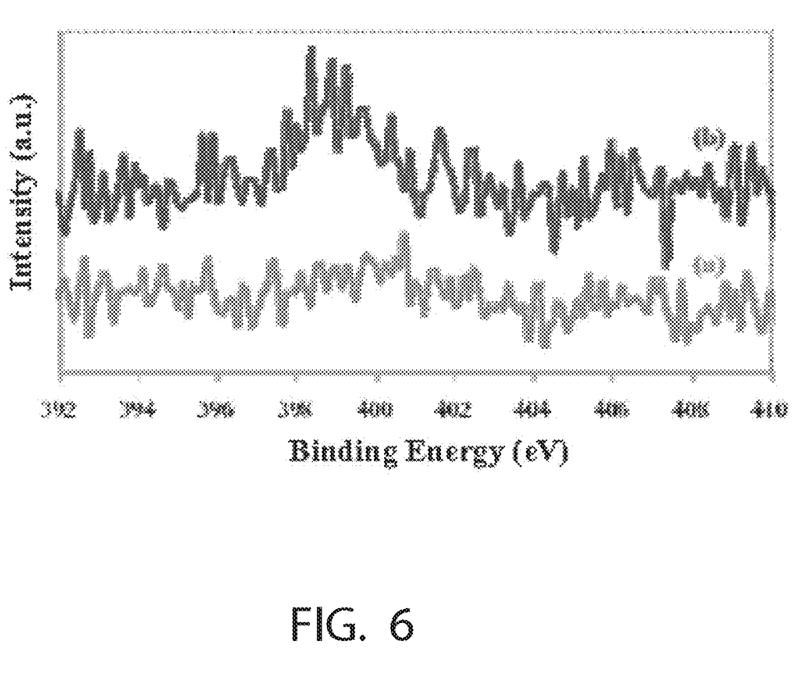
FIG. 6 shows N1s X-ray photoelectron spectra of $TiO_2$ a) before doping and b) after nitrogen doping.

X-Ray Photoelectron Spectroscopy:

The chemical binding states of the prepared nitrogen doped titania samples are analyzed through XPS and is shown in FIG. 6. The raw titania samples does not contain any impurity as confirmed by the absence of any peak in the N1s spectra of blank titania. A broad peak is found in 398 nm-400 nm region in the N1s spectrum of N doped $TiO_2$ which can be assigned to the anionic N in O—Ti—N linkages. The XPS data is also used to calculate the amount of nitrogen doping. The data indicate high yield of nitrogen doping (2.7 atomic %) into $TiO_2$ matrix (theoretical loading was 2.83 atomic %). This clearly confirms that wet milling method is highly effective in doping nitrogen into $TiO_2$ matrix.

Figure 7:
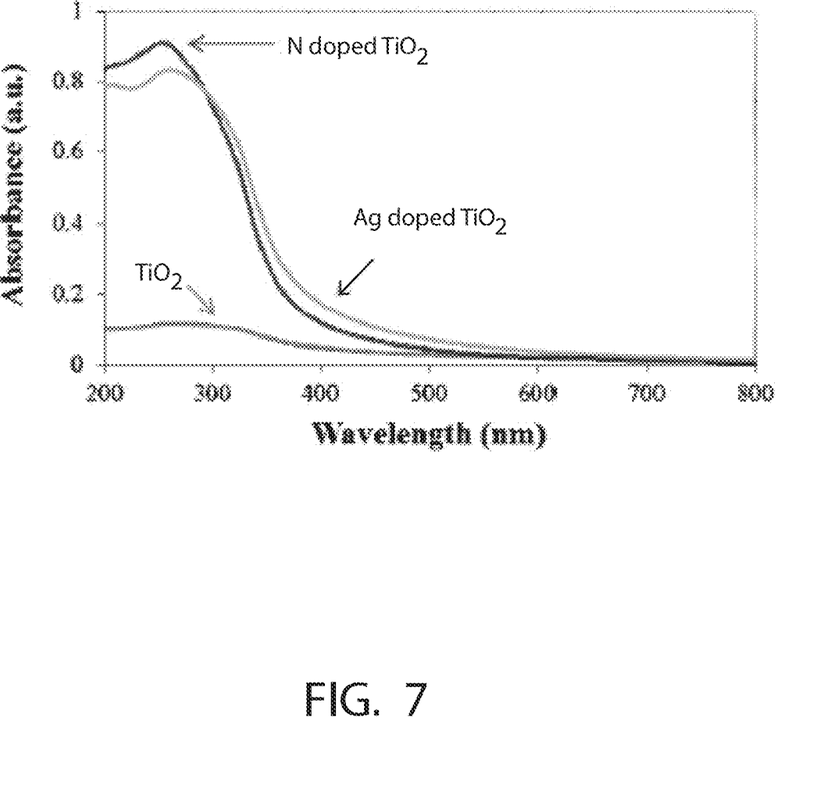
FIG. 7 shows UV-vis spectra of $TiO_2$ before and after doping.

UV Visible Spectroscopy:

FIG. 7 shows the UV visible spectra of undoped and doped titania particles. It can be clearly seen that after doping, the absorption band shifts towards the visible region for both the doped samples. The absorption is improved after doping on titania and the shift is more for Ag doped $TiO_2$ samples as compared to N doped $TiO_2$ samples suggesting more visible light activity of the former one than that of the latter.

COMPARATIVE EXAMPLES

EXAMPLE 4

Dry Grinding 3.8 gm of anatase titania particles having purity of 99.9% was mixed with 0.2 gm of ammonium carbonate in a ball mill pot. Zirconia balls (100 gm) of 0.4-0.7 mm diameter were introduced as oxide milling media in the tank. Milling was carried out at a speed of 250 rpm for two hours at (20 to 50° C.). Doped titania showed particle size distribution in the range of 140 to 160 nm.

EXAMPLE 5

Using Less Water 3.8 gm of anatase titania particles having purity of 99.9% was mixed with 0.2 gm of ammonium carbonate and 10 ml water in a ball mill pot. Zirconia balls (100 gm) of 0.4-0.7 mm diameter were introduced as oxide milling media in the tank. Milling was carried out at a speed of 250 rpm for two hours at (20 to 50° C.). The resultant slurry after milling was filtered through a filter cloth to separate the oxide milling media. Doped titania showed particle size distribution in the range of 80-85 nm.

EXAMPLE 6

Using Excess Water 3.8 gm of anatase titania particles having purity of 99.9% was mixed with 0.2 gm of ammonium carbonate and 50 ml water in a ball mill pot. Zirconia balls (100 gm) of 0.4-0.7 mm diameter were introduced as oxide milling media in the tank. Milling was carried out at a speed of 250 rpm for two hours at (20 to 50° C.). The resultant slurry after milling was filtered through a filter cloth to separate the oxide milling media. Doped titania showed size distribution in the range of 85-88 nm.

Photocatalytic Activity Test

Photocatalytic activity of doped $TiO_2$ samples was evaluated by the degradation of 10 ppm methyl orange (MO) dye, a model pollutant. In a typical experiment, 100 mg or equivalent amount of photocatalyst was dispersed in 140 ml of MO solution. After 30 minute stirring under dark environment for adsorption-desorption equilibrium, the photocatalyst solution was kept under sunlight for 3 hours. At given time intervals, around 5 ml of samples were centrifuged, filtered through millipore filter paper and the filtrate was tested by UV-visible analysis. A standard calibration curve was then used to convert the absorbance values into concentration values and plotted against irradiation time.

Figure 8A:
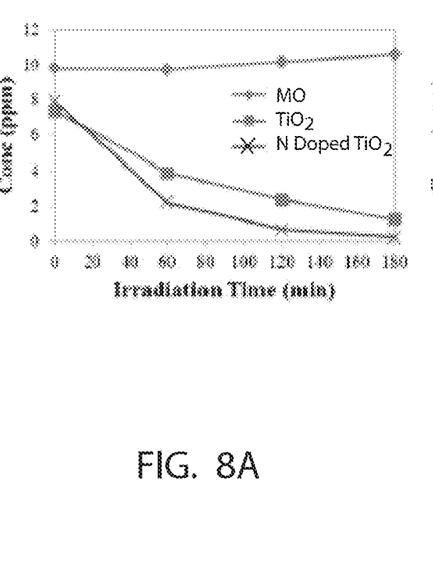
FIGS. 8A and 8B show photocatalytic degradation of methyl orange (MO) over time under sunlight irradiation in presence of a) undoped $TiO_2$, b) N doped $TiO_2$ and c) Ag doped $TiO_2$.
Figure 8B:
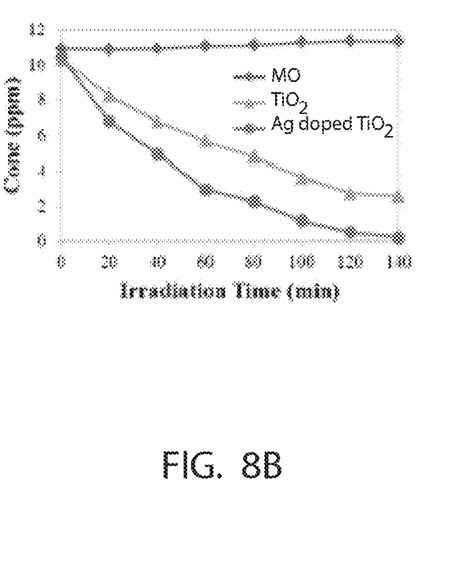

FIGS. 8A and 8B show degradation of MO in presence of doped titania is faster compared to the undoped sample under sunlight irradiation for both N doped and Ag doped titania (Example 1 & 3, respectively). In addition, no degradation of MO is observed in absence of $TiO_2$ under sunlight irradiation indicating that the decrease in concentration of MO in presence of different titania samples is not due to self-degradation of MO under sunlight. A slight increase in blank MO concentration over time is due to the evaporation of water from blank MO solution.

Figure 9A:
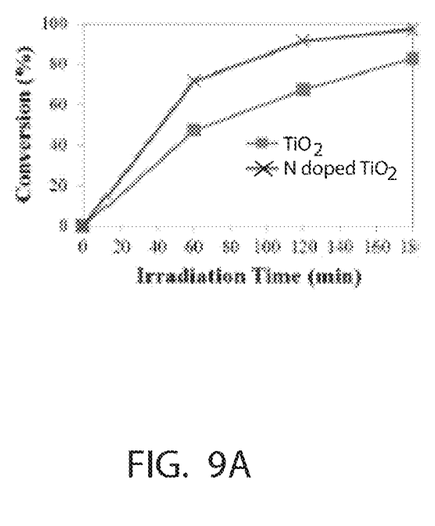
FIGS. 9A and 9B show photocatalytic conversion of methyl orange (MO) over time under sunlight irradiation in presence of a) undoped $TiO_2$, b) N doped $TiO_2$ and c) Ag doped $TiO_2$.
Figure 9B:
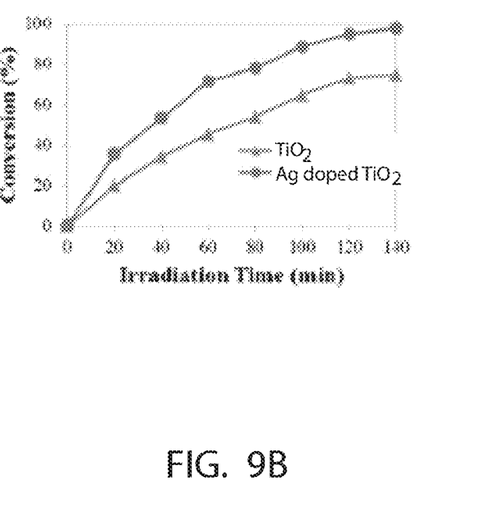

The photocatalytic conversion of MO can be calculated from the following expression:

$$\eta = \frac{(C_0 - C_t)}{C_0} \times 100$$

where, $\eta$=photocatalytic conversion $C_0$=concentration of MO before sunlight irradiation $C_t$=concentration of MO after sunlight irradiation for time t The photocatalytic conversion of methyl orange (MO) under sunlight irradiation is shown in FIGS. 9A and 9B for different titania samples prepared in accordance with the present disclosure (Example 1 & 3). For each of the photocatalytic experiments with doped titania, undoped titania samples are treated as reference. The photocatalytic conversion of nitrogen doped $TiO_2$ samples after 1 hour is 72% compared to 47%, in presence of undoped $TiO_2$. Similarly, for Ag doped $TiO_2$ samples, the photocatalytic conversion is found to be 72% after 1 hour, whereas for undoped $TiO_2$, it is 45%. After 1 hour, the degradation rate became faster for Ag doped $TiO_2$ samples compared to N doped $TiO_2$ samples and within 140 minutes, 98% of MO is found to be degraded in presence of Ag doped $TiO_2$. On the other case, N doped $TiO_2$ samples took 180 minutes to degrade 97% of MO in presence of sunlight.

Table 1 summarizes the photocatalytic conversion of methyl orange (MO) under sunlight irradiation for doped titania particles prepared in accordance with the present disclosure Example 1, Example 3, Example 4 (dry grinding), Example 5 (using less amount of water), Example 6 (using excess amount of water) and undoped titania.

| Experiment | Water content based on the total mass of the mixture | Photocatalytic conversion after 1 hour | Photocatalytic conversion after 2 hours | Photocatalytic conversion after 3 hours |
| --- | --- | --- | --- | --- |
| (Undoped titania) | NIL | 47% | 68% | 83% |
| Example 4 | NIL | Not Available | 54% | 81% |
| Example 5 | 8.8% | Not Available | 25% | 46% |
| Example 1 | 19% | 72% | 92% | 97% |
| Example 6 | 32% | 56% | 88% | 96% |
| Example 3 | 22.3% | 72% | 95% | 100% |

The above results clearly suggest that the doped titania photocatalysts prepared in accordance with the present disclosure possess photocatalytic activity greater than 90% at 2 hours under sunlight irradiation as compared to undoped titania.

The above results also clearly indicate that the photocatalytic activity of the doped titania particles depends on the rheology of the slurry formed in the milling process. An adequate amount of water is required to form the slurry of right rheology. The presence of less/more amount of water affects the efficiency of the mechanochemical reaction which further lowers the photocatalytic activity of the doped titania particles as observed in Example 4, 5 & 6. However, the effect is more pronounced while using less water than that of excess one.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

While considerable emphasis has been placed herein on the specific steps of the preferred process, it will be appreciated that many steps can be made and that many changes can be made in the preferred steps without departing from the principles of the disclosure. These and other changes in the preferred steps of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for the synthesis of doped titania nanoparticles said process comprising the following steps:
 a) milling a mixture containing anatase titania particles, a precursor compound, said compound selected from the group consisting of metal and non-metal salts, water and oxide milling media, at a temperature in the range of 20 to 50° C. for a period of 60-120 minutes, to form a slurry, wherein the amount of water is in the range of 15 to 25% by weight of the total mixture; and
 b) filtering the slurry to separate the oxide milling media and obtain a filtrate containing doped titania nanoparticles.

2. The process as claimed in claim 1, wherein the process further includes the step of drying the filtrate by any one of the methods selected from the group consisting of freeze drying, vacuum drying and air drying at low temperature.

3. The process as claimed in claim 1, wherein the non-metal salt is selected from the group consisting of ammonium carbonate and urea.

4. The process as claimed in claim 1, wherein the metal salt is silver nitrate.

5. The process as claimed in claim 1, wherein the ratio of precursor compound to titania particles is in the range of 1:5 to 1:25 w/w.

6. The process as claimed in claim 1, wherein the oxide milling media consists of Zirconia balls with particle size in the range of 0.4-0.7 mm diameter.

7. The process as claimed in claim 1, wherein the doped titania nanoparticles are unimodal with median particle size 90-92 nm.

8. The process as claimed in claim 1, wherein the doped titania nanoparticles has photocatalytic activity greater than 90% at 2 hours under sunlight irradiation.

9. The process as claimed in claim 1, wherein the doped titania nanoparticles, are nitrogen doped anatase titania nanoparticles, wherein an amount of nitrogen doped on the anatase titania surface is 2.7%.

10. The process as claimed in claim 1, wherein the doped titania nanoparticles, are silver doped anatase titania nanoparticles, wherein an amount of silver atoms doped on the anatase titania surface is 0.45%.

11. Anatase titania nanoparticles with median particle size in the range of 90-92 nm having photocatalytic activity greater than 90% at 2 hours under sunlight irradiation, wherein the anatase titania nanoparticles are nitrogen doped anatase titania nanoparticles, wherein an amount of nitrogen doped on the anatase titania surface is 2.7%.

12. Anatase titania nanoparticles with median particle size in the range of 90-92 nm having photocatalytic activity greater than 90% at 2 hours under sunlight irradiation, wherein the anatase titania nanoparticles are silver doped anatase titania nanoparticles, wherein an amount of silver atoms doped on the anatase titania surface is 0.45%.

* * * * *